(12) United States Patent
Kwak

(10) Patent No.: US 11,098,732 B2
(45) Date of Patent: Aug. 24, 2021

(54) VANE RING ASSEMBLY AND COMPRESSOR AND GAS TURBINE INCLUDING THE SAME

(71) Applicant: DOOSAN HEAVY INDUSTRIES & CONSTRUCTION CO., LTD., Changwon-si (KR)

(72) Inventor: Young Seob Kwak, Changwon-si (KR)

( * ) Notice: Subject to any disclaimer, the term of this patent is extended or adjusted under 35 U.S.C. 154(b) by 73 days.

(21) Appl. No.: 15/949,074

(22) Filed: Apr. 10, 2018

(65) Prior Publication Data

US 2018/0347586 A1 Dec. 6, 2018

(30) Foreign Application Priority Data

May 30, 2017 (KR) .......................... 10-2017-0066805

(51) Int. Cl.
| | |
|---|---|
| F01D 5/30 | (2006.01) |
| F04D 29/54 | (2006.01) |
| F04D 29/64 | (2006.01) |
| F02C 3/06 | (2006.01) |
| F01D 9/04 | (2006.01) |
| F01D 25/24 | (2006.01) |
| F04D 29/32 | (2006.01) |

(52) U.S. Cl.
CPC .......... *F04D 29/542* (2013.01); *F01D 9/042* (2013.01); *F01D 25/246* (2013.01); *F02C 3/06* (2013.01); *F04D 29/644* (2013.01); *F01D 5/3007* (2013.01); *F01D 5/3038* (2013.01); *F01D 5/3092* (2013.01); *F04D 29/322* (2013.01); *F05D 2220/32* (2013.01); *F05D 2220/3216* (2013.01); *F05D 2240/12* (2013.01); *F05D 2260/30* (2013.01); *F05D 2260/31* (2013.01)

(58) Field of Classification Search
CPC ...... F01D 5/3007; F01D 5/3053; F01D 5/323; F01D 5/326; F04D 29/322; F04D 29/323; F04D 29/542; F04D 29/644
See application file for complete search history.

(56) References Cited

U.S. PATENT DOCUMENTS

| | | | | |
|---|---|---|---|---|
| 3,165,294 A | * | 1/1965 | Anderson | ................. F01D 5/06 |
| | | | | 416/220 R |
| 3,603,702 A | * | 9/1971 | Jensen | ................. F01D 5/3007 |
| | | | | 416/220 R |

(Continued)

FOREIGN PATENT DOCUMENTS

| | | | | |
|---|---|---|---|---|
| EP | 1788198 A2 | * | 5/2007 | ............. F01D 5/326 |
| JP | 0571304 A | | 3/1993 | |

(Continued)

*Primary Examiner* — Woody A Lee, Jr.
*Assistant Examiner* — Behnoush Haghighian
(74) *Attorney, Agent, or Firm* — Harvest IP Law, LLP

(57) ABSTRACT

A vane ring assembly, and a compressor and gas turbine including the vane ring assembly, can prevent vibration of vanes and inhibit wear of the vane due to vibration by firmly and tightly fixing the vanes in contact with a ring. The vane ring assembly includes a retaining ring having inner and outer sides extending in a circumferential direction; a plurality of vanes respectively disposed around the inner side of the retaining ring and configured to be fastened to the retaining ring; and a plurality of fixing parts configured to be fastened to a surface of each vane, by passing through the retaining ring to fix the vanes to the inner side of the retaining ring.

20 Claims, 7 Drawing Sheets

(56) References Cited

U.S. PATENT DOCUMENTS

| | | | | |
|---|---|---|---|---|
| 3,784,320 | A * | 1/1974 | Rossmann | F01D 5/3084 416/215 |
| 4,820,127 | A * | 4/1989 | Cohen | F01D 5/30 416/206 |
| 4,980,241 | A * | 12/1990 | Hoffmueller | F01D 5/066 277/345 |
| 5,087,174 | A * | 2/1992 | Shannon | F01D 5/28 29/889.21 |
| 5,160,243 | A * | 11/1992 | Herzner | F01D 5/28 416/220 R |
| 5,240,375 | A * | 8/1993 | Wayte | F01D 5/28 416/219 R |
| 5,628,621 | A * | 5/1997 | Toborg | F01D 5/066 416/198 A |
| 5,906,096 | A * | 5/1999 | Siga | C22C 38/44 415/199.5 |
| 6,981,847 | B2 * | 1/2006 | Arinci | F01D 5/3038 416/193 A |
| 7,467,925 | B2 * | 12/2008 | Schroder | F01D 5/3053 29/889.1 |
| 7,686,576 | B2 * | 3/2010 | Martin | F01D 9/042 415/137 |
| 8,562,294 | B2 * | 10/2013 | Gouda | F01D 25/12 416/96 R |
| 8,764,402 | B2 * | 7/2014 | Agaram | F01D 5/323 416/220 R |
| 9,163,513 | B2 * | 10/2015 | Bestwick | F01D 5/027 |
| 9,909,429 | B2 * | 3/2018 | Cosby | F01D 5/3053 |
| 2006/0018756 | A1 * | 1/2006 | Schroder | F01D 5/3053 416/219 R |
| 2006/0251521 | A1 * | 11/2006 | Hernandez | F01D 5/3023 416/219 R |
| 2009/0324414 | A1 * | 12/2009 | Helmis | F01D 5/326 416/220 R |
| 2010/0028146 | A1 * | 2/2010 | Martin | F02C 6/08 415/209.3 |
| 2011/0135479 | A1 * | 6/2011 | Ueda | F01D 11/001 416/179 |
| 2012/0051923 | A1 * | 3/2012 | McDonald | F01D 9/042 416/219 R |
| 2012/0251329 | A1 * | 10/2012 | Hirata | F01D 5/3038 416/220 R |
| 2016/0084260 | A1 * | 3/2016 | Clarke | F04D 29/324 416/147 |
| 2016/0245101 | A1 * | 8/2016 | Humhauser | F04D 29/322 |
| 2016/0333889 | A1 * | 11/2016 | Kray | F04D 29/325 |
| 2016/0341052 | A1 * | 11/2016 | Li | F01D 5/3092 |

FOREIGN PATENT DOCUMENTS

| | | |
|---|---|---|
| JP | 2007138944 A | 6/2007 |
| JP | 2008106748 A | 5/2008 |

\* cited by examiner

[Fig 1]
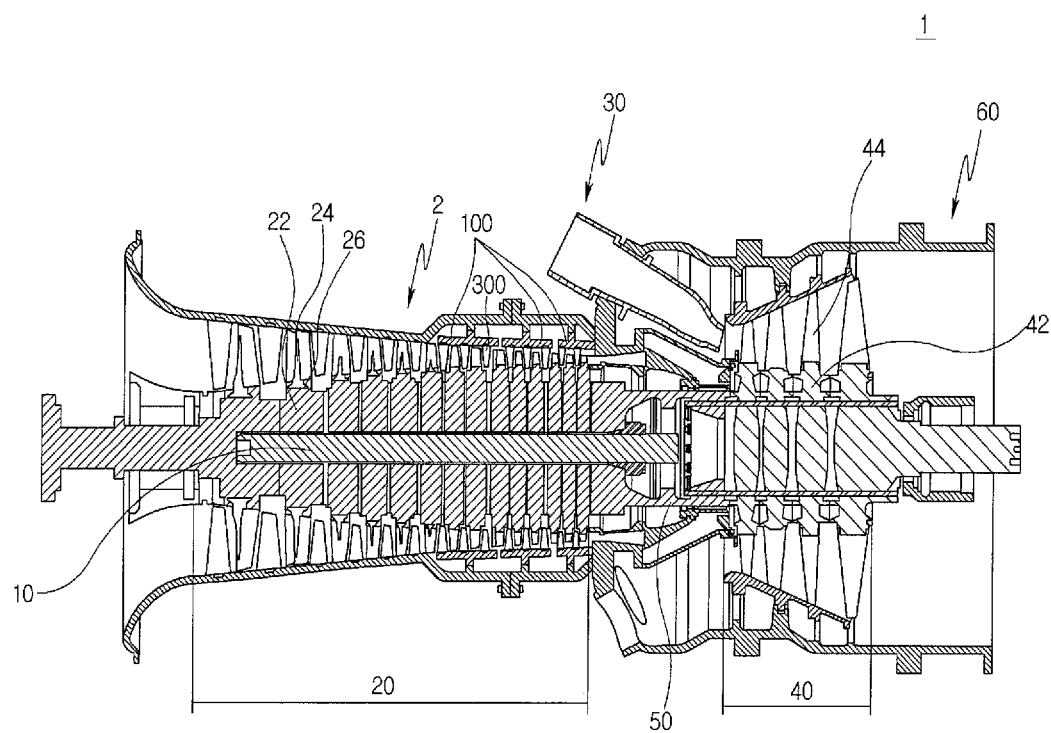

[Fig 2]
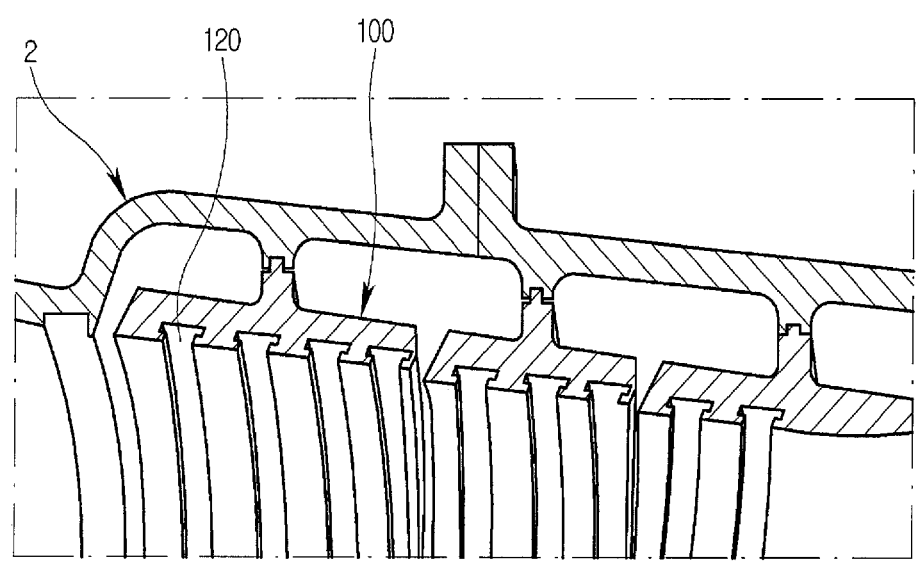

[Fig 3]
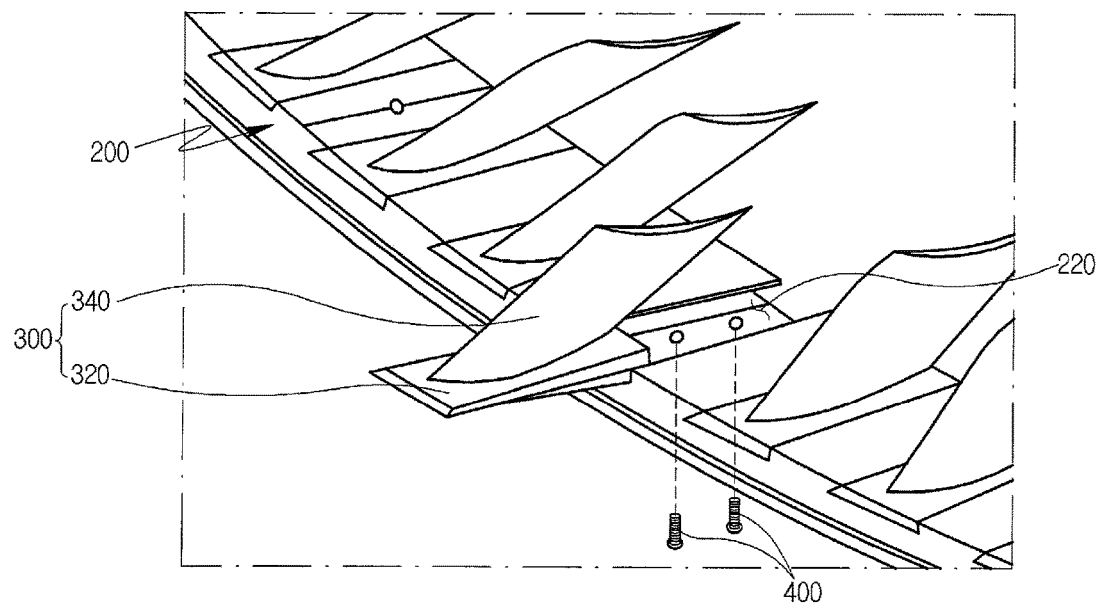

[Fig 4]
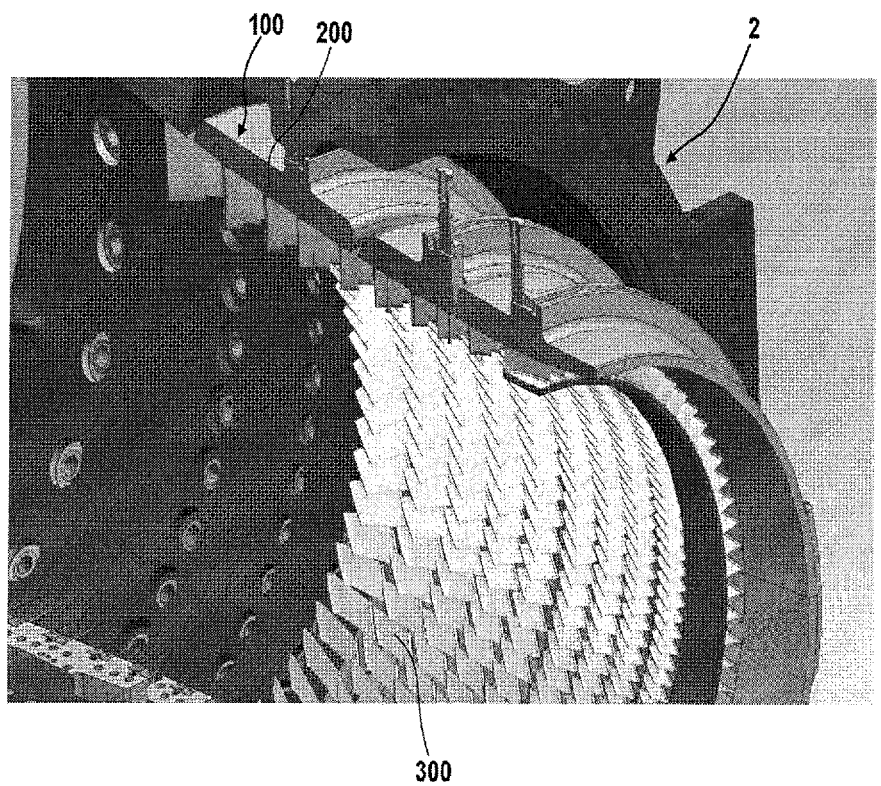

[Fig 5]
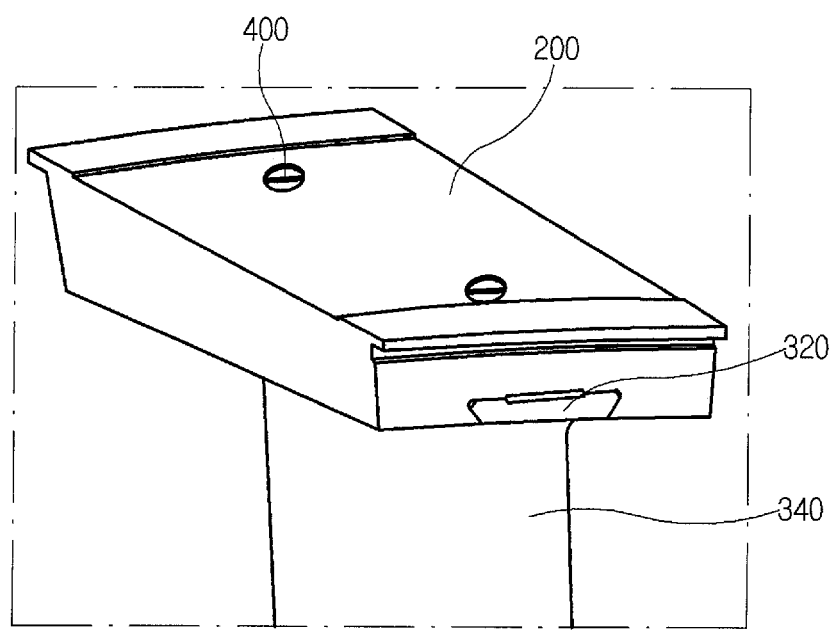

[Fig 6]
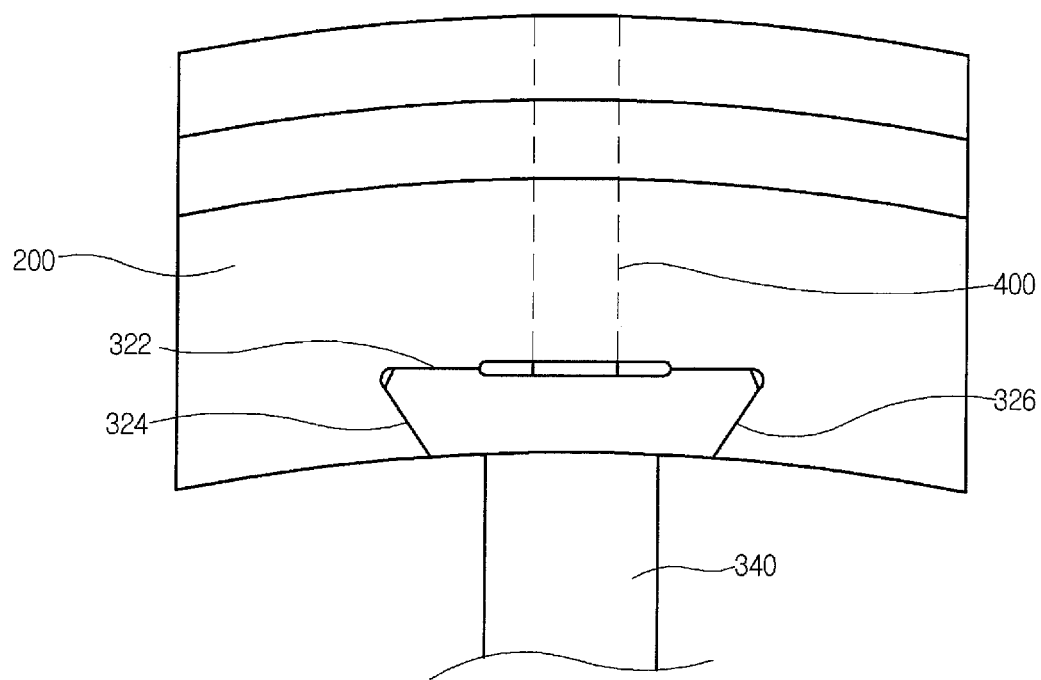

[Fig 7]
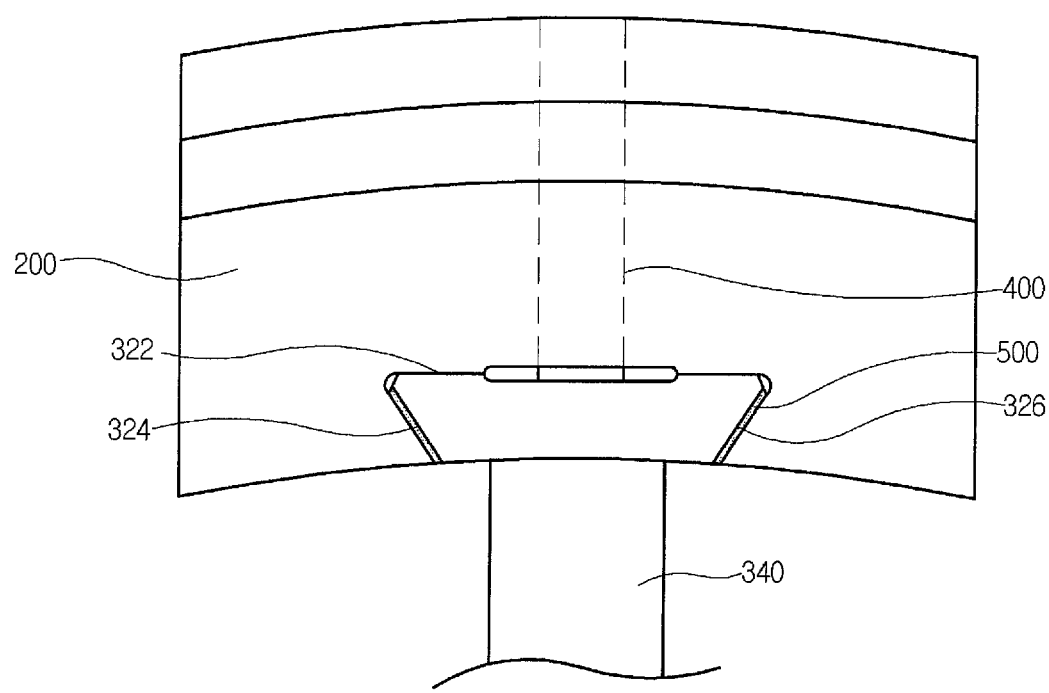

VANE RING ASSEMBLY AND COMPRESSOR AND GAS TURBINE INCLUDING THE SAME

CROSS REFERENCE TO RELATED APPLICATIONS

The present application claims priority to Korean Patent Application No. 10-2017-0066805, filed May 30, 2017, the entire contents of which is incorporated herein for all purposes by this reference.

BACKGROUND OF THE INVENTION

Field of the Invention

The present invention relates to a vane ring assembly, and a compressor and gas turbine including the vane ring assembly and, more particularly, to a vane ring assembly that can prevent vibration of vanes and wear of the vanes due to vibration by firmly and tightly fixing the vanes to a ring, and a compressor and gas turbine including the vane ring assembly.

Description of the Related Art

A turbine is a mechanical device that obtains torque from impulsive force or reaction force, using the flow of a compressed fluid such as gas. Examples of such a turbine include a steam turbine using steam, a gas turbine using high-temperature combustion gas, and the like.

The gas turbine is primarily composed of a compressor, a combustor, and a turbine. The compressor includes an air inlet port for receiving air and a compressor casing in which a plurality of compressor vanes and compressor blades are alternately arranged.

The combustor produces high-temperature, high-pressure combustion gas by supplying fuel to compressed air produced through the compressor and igniting the air-fuel mixture.

The turbine includes a turbine casing in which a plurality of turbine vanes and turbine blades are alternately arranged. A rotor is disposed through the centers of the compressor, the combustor, the turbine, and an exhaust chamber.

The rotor is rotatably supported at both ends by bearings. A plurality of discs is fixed to the rotor, blades are connected to each of the discs, and the driving shaft of a generator or the like is connected to the exhaust chamber-side end of the rotor.

Accordingly, the air compressed through the compressor and fuel are mixed and combusted, whereby high-temperature combustion gas is produced, and the combustion gas produced in this way is sprayed into the turbine. The sprayed combustion gas generates torque by passing the turbine vanes and turbine blades, whereby the rotor is rotated.

The compressor vanes may be fixed to an inner surface of the compressor casing or may be fixed by a vane retaining ring fixed to the compressor casing. Accordingly, the compressor vanes, unlike the compressor blades that are rotated with the rotor, are fixed to the compressor casing and change the direction of airflow so that the air flows to the compressor blades at an appropriate angle. Further, the compressor vanes can minimize vortexes in the airflow.

However, the compressor vanes are vibrated by airflows generated by rotation of adjacent blades and vibration transmitted through the compressor casing, so the compressor vanes become worn.

In particular, wear is caused and the fastening force is reduced at the joints between the compressor vanes and the compressor casing.

SUMMARY OF THE INVENTION

The present invention has been made in an effort to solve the problems and an object of the present invention is to provide a vane ring assembly that can prevent vibration of vanes and wear of the vanes due to vibration by firmly and tightly fixing the vanes to a ring, and a compressor and gas turbine including the vane ring assembly.

In order to solve the problems, the present invention provides a vane ring assembly which may include a retaining ring having inner and outer sides extending in a circumferential direction; a plurality of vanes respectively disposed around the inner side of the retaining ring and configured to be fastened to the retaining ring; and a plurality of fixing parts configured to be fastened to a surface of each vane, by passing through the retaining ring to fix the vanes to the inner side of the retaining ring.

Further, the present invention provides a compressor which may include a casing; at least one vane carrier disposed inside the casing; at least one retaining ring respectively fitted in the at least one vane carrier, each retaining ring having inner and outer sides extending in a circumferential direction; a plurality of vanes respectively disposed around the inner side of each retaining ring and configured to be fastened to each retaining ring; and a plurality of fixing parts configured to be fastened to a surface of each vane, by passing through each retaining ring to fix the vanes to the inner side of each retaining ring. The compressor may further include a ring groove circumferentially formed in an inner side of each vane carrier. Here, the plurality of vanes may be fastened to each retaining ring.

Further, the present invention provides a gas turbine which may include the above compressor to suction and compress air to a high pressure; a combustor to mix the compressed air with fuel and combust the mixture; and a turbine to generate power by rotating turbine blades, using combustion gas discharged from the combustor.

The plurality of fixing parts may be further configured to fasten the vanes to the retaining ring, by respectively engaging with the surface of each vane through the retaining ring.

The engaged surface may be a bottom surface of a dovetail portion of the each vane.

The vane ring assembly may further include a plurality of dovetail grooves disposed around the retaining ring and formed in the inner side of the retaining ring to respectively receive the plurality of vanes, and each vane may include a dovetail portion fitted into a corresponding dovetail groove; and a blade portion protruding from the dovetail portion in a radial direction of the retaining ring. The fixing parts may be further configured to be fastened through the retaining ring, from the outer side to the inner side, to respectively engage with the dovetail portions.

The plurality of fixing parts may include a pair of fixing members for each vane, each pair arranged in a direction in which the dovetail portion of the vane is fitted into the dovetail groove, and the fixing members and include set screws.

Each dovetail portion may include a bottom; and first and second inclined sides respectively extending from opposite ends of the bottom to the blade portion. The first and second inclined sides may be respectively inclined such that a width of the dovetail decreases toward the blade portion. The fixing parts may be further configured to be fastened through the retaining ring, from the outer side to the inner side, to respectively engage with the bottoms of the dovetail portions. The first and second inclined sides may be fitted into the corresponding dovetail groove by being forcibly inserted into the dovetail groove.

The vane ring assembly may further include a coating layer formed on the first and second inclined sides to inhibit wear of the dovetail portion.

The vane ring assembly may further include elastic intermediate members respectively disposed between the dovetail groove and the first and second inclined sides facing the dovetail groove. The elastic intermediate members may have a flat shape configured to be hermetically pressed between the dovetail groove and the first and second inclined sides facing the dovetail groove.

According to the present invention, the vane is firmly and tightly fixed in contact with the ring, that is, the dovetail portion of the vane is firmly and tightly in contact with the dovetail groove of the ring, so as not to move in the dovetail groove, so vibration of the vane can be prevented.

Accordingly, it is possible to inhibit wear of the vane and reduction of the fastening force to the ring.

Further, elastic intermediate members are disposed or coating layers are fixated at the portion where the dovetail portion of the vane is firmly and tightly in contact with the dovetail groove, so wear can be inhibited.

Further, since set screws are used to fix the vanes, assembly and disassembly is simple and convenient, so maintenance is also easy.

The effects of the present invention are not limited thereto and it should be understood that the effects include all effects that can be inferred from the configuration of the present invention described in the following specification or claims.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a cross-sectional view showing a gas turbine according to an embodiment of the present invention;

FIG. 2 is a partially cutaway, perspective view of three vane carriers and a portion of the compressor casing shown in FIG. 1;

FIG. 3 is a perspective view showing a vane ring assembly according to an embodiment of the present invention;

FIG. 4 is a perspective view showing a state in which the vane ring assembly shown in FIG. 3 is combined with components shown in FIG. 2;

FIGS. 5 and 6 are a perspective view and a front view of a portion of the vane ring assembly shown in FIG. 3, respectively; and FIG. 7 is a front view of a vane ring assembly according to another embodiment of the present invention.

DETAILED DESCRIPTION OF THE INVENTION

Hereafter, exemplary embodiments of a vane ring assembly and a compressor and gas turbine including the vane ring assembly of the present invention are described with reference FIGS. 1 to 7.

Further, technical terms, as will be mentioned hereinafter, are terms defined in consideration of their function in the present invention, which may be varied according to the intention of a user, practice, or the like, and the following embodiments are merely examples of components described in claims, and should not be interpreted as limiting the scope of the present invention.

In the accompanying drawings, portions unrelated to the description will be omitted in order to clearly describe the present invention, and similar reference numerals will be used to describe similar portions throughout the present specification. Throughout the present specification, unless explicitly described otherwise, "comprising" any components will be understood to imply the inclusion of other components rather than the exclusion of any other components.

First, a gas turbine to which an embodiment of a vane ring assembly of the present invention can be applied is described. In FIG. 1, an example of a gas turbine 1 is shown.

Referring to FIG. 1, the gas turbine 1 according to an embodiment of the present invention may primarily include: a compressor 20 that suctions air and compresses the air to a high pressure; a combustor 30 that mixes the air compressed by the compressor 20 with fuel and combusts the mixture; and a turbine 40 that generates power by rotating turbine blades, using the high-temperature, high-pressure combustion gas discharged from the combustor 30.

The gas turbine 1 includes a casing 2, a compressor 20 section situated upstream from the casing 2, according to airflow directionality, and a turbine 40 section situated on the downstream side. A transmission 50, as a torque transmission device for transmitting torque generated by the turbine 40 to the compressor 20, is disposed between the compressor and turbine sections. A diffuser 60 for discharging the combustion gas that has passed through the turbine 40 is formed at the rear portion of the casing 2, and the combustor 30 for receiving the compressed air is disposed ahead of the diffuser 60.

The casing 2 may be a single unit casing, integrally formed and covering the entire gas turbine 1, or may be a casing assembly formed by combining separately provided components of a compressor casing and a turbine casing.

The compressor 20 may include a casing 2 forming the external shape of a gas turbine compressor, but the present invention is not limited thereto, and the casing 2 may be formed substantially in a hollow cylindrical shape. The compressor 20 includes a plurality of compressor rotor discs 22 (for example, fourteen) and the compressor rotor discs 22 are fastened with no axial gaps by a tie rod 10.

The tie rod 10 is disposed through the centers of the compressor rotor discs 22 with has a first end fitted in the compressor rotor disc 22 farthest upstream and a second end fixed in the transmission 50. The tie rod 10 may have various structures, depending on the gas turbine, and is not necessarily limited to the form shown in FIG. 1. That is, one tie rod may be disposed through the centers of the rotor discs, as in FIG. 1, or a plurality of tie rods may be circumferentially arranged. A combination of these two structure types is also possible.

The compressor rotor discs 22 are axially arranged with the tie rod 10 passing substantially through their centers. Opposing sides of adjacent compressor rotor discs 22 are pressed in contact with each other by the tie rod 10, preventing relative rotation.

A plurality of blades 24 are coupled to the outer circumference of each of the compressor rotor discs 22. The blades 24 have roots 26, and the roots 26 are fastened to the compressor rotor discs 22. The blades 24 may be arranged with their radial outer (distal) ends spaced a predetermined distance from an inner surface of the casing 2. That is, the blades 24 may be arranged axially in a plurality of rows on the outer sides of the compressor rotor discs 22 with a predetermined tip gap therebetween.

The fastening of the roots 26 to the compressor rotor discs 22 includes a tangential type and an axial type. The fastening type can be selected in accordance with the structures required by common gas turbines and may have a dovetail or fir-tree shape that is generally known in the art. In some cases, the blades can be alternatively fastened to the compressor rotor discs, for example, using fasteners such as keys or bolts.

A plurality of vanes 300 may be circumferentially disposed, in the compressor 20, on the casing 2 or on the vane carriers 200. The vanes 300 may be arranged in a plurality of rows in the axial direction of the tie rod 10, alternating with the blades 24 arranged in a plurality of rows on the outer sides of the compressor rotor discs 22. That is, the blades 24 and the vanes 300 are alternately arranged in the axis direction of the tie rod 10 in the casing 2. The radial inner ends of the vanes 300 may be spaced a predetermine distance from the compressor rotor discs 22.

As shown in FIG. 2, a number of vane carriers 100, for example, three, may be fixed in the casing 2, at a predetermined distance from the inner surface of the casing 2. Thus, the vanes 300 are coupled directly to the casing 2 or to the vane carriers 100 through retaining rings 200, which will be described in detail below.

The vanes 300 are fixed, unlike the compressor rotor discs 22, so as not to rotate. Thus, the vanes 300 serve to arrange the flow of compressed air that has passed the blades 24 coupled to the compressor rotor discs 22, to guide the air to the blades 24 at the downstream side.

The structure of coupling the vanes 300 to the vane carrier 100 is described in detail below.

As described above, external air can be suctioned inside through the compressor, compressed at several stages while passing the blades 24 and the vanes 300, and then supplied to the turbine 40 via the compressor 30.

Though not shown in the figures, vanes that function as guide vanes may be disposed behind a diffuser in the compressor 20 of the gas turbine to fit the flow angle of fluid, which flows into the combustor 30 after being increased in pressure, to the designed flow angle.

Next, the combustor 30 is briefly described. The combustor 30 mixes the compressed air flowing therein from the compressor 20 with fuel and combusts the air-fuel mixture, thereby producing high-temperature, high-pressure combustion gas having high energy. Further, through an isobaric combustion process, the temperature of the combustion gas increased up to a heat resistance limit that the combustor and turbine components can withstand.

A plurality of the combustors 30 constituting the combustion system of a gas turbine may be arranged in cell types in a casing and each may include a burner having a fuel spray nozzle etc., and a combustor liner forming a combustion chamber, and a transition piece that is a bridge between the combustor 30 and the turbine 40.

In detail, the liner provides a combustion space where fuel sprayed from the fuel spray nozzle is mixed with compressed air from the compressor 20. The liner may include a flame tube providing a combustion space where the fuel mixed with air is combusted, and a flow sleeve forming a ring-shaped space around the flame tube. The fuel spray nozzle may be coupled to the front end of the liner and an ignition plug may be couple to the side of the liner.

The transition piece is coupled to the rear end of the liner to be able to send the combustion gas burned by the ignition plug to the turbine 40. The outer side of the transition piece is cooled by the compressed air from the compressor 20 to prevent damage due to high temperature of the combustion gas.

The transition piece has holes for cooling so that air can be sprayed inside, and the compressed air cools a main body disposed inside through the holes and then flows to the liner.

The cooling air that has cooled the transition piece flows through the ring-shaped space of the liner and the compressed air can be supplied through cooling holes of the flow sleeve forming the outer side of the liner and can hit against the cooling air.

The high-temperature, high-pressure combustion gas coming out of the combustor 30 is supplied to the turbine and causes torque by inducing impulsive force and reaction force on the blades of the turbine while expanding. The torque is transmitted to the compressor 20 through the transmission 50 and power exceeding power for driving the compressor is used to drive a generator, thereby producing power.

The turbine section is fundamentally similar in structure to the compressor section. That is, the turbine 40 also includes a plurality of turbine rotor discs 42 similar to the compressor rotor discs 22 of the compressor. The turbine rotor discs 42 each also have a plurality of turbine blades 44 circumferentially arranged on the outer side thereof. The turbine blades 44, similarly, can be fastened to the turbine rotor discs 42 in a dovetail type.

A plurality of vanes (not shown) is disposed between the blades 44 of the turbine rotor discs 42, so it is possible to guide the combustion gas that has passed through the blades 44.

In the gas turbine having the structure described above, air flowing inside is compressed in the compressor section, combusted in the combustor 30, sent to the turbine section to drive the turbine 40, and then discharged to the atmosphere through the diffuser 60.

The gas turbine is merely an embodiment of the present invention and the vane ring assembly of the present invention to be described below can be applied to all common gas turbines.

A vane ring assembly according to an embodiment of the present invention is described hereafter in detail with reference to FIGS. 3, and 5 to 6.

A vane ring assembly according to an embodiment of the present invention may primarily include: a retaining ring 200 having inner and outer sides extending in a circumferential direction; a plurality of vanes 300 respectively disposed around the inner side of the retaining ring 200, to be spaced apart from each other, and configured to be fastened to the retaining ring 200; and a plurality of fixing parts configured to be fastened to a surface of each vane 300, by passing through the retaining ring 200 to fix the vanes 300 to the inner side of the retaining ring 200. Here, the plurality of fixing parts may be further configured to fasten the vanes 300 to the retaining ring 200, by respectively engaging with the surface of each vane 300 through the retaining ring 200, wherein the engaged surface is a bottom surface of dovetail portion of the each vane.

The vanes 300 may be fastened to the ring 200 in a tangential type or an axial type, and the types may be selected in accordance with the structures required by common gas turbines. In an embodiment, the axial type that fits the vanes 300 in the axial direction of the tie rod 10 such that the vanes 300 are arranged circumferentially with a gap therebetween on the inner side of the ring 200 is applied.

To this end, a plurality of dovetail grooves 220 in which the vanes 300 are inserted is formed and arranged circumferentially with a predetermined gap therebetween on the inner side of the ring 200.

The vanes 300 each may have a dovetail portion 320 to be fastened to the dovetail groove 220 and a blade portion 340 protruding from the dovetail portion in the radial direction of the ring 200.

The dovetails 320 each may have a bottom 322, forming the side of the dovetail 320 opposite the blade portion 340, and first and second inclined sides 324 and 326 respectively extending from opposite ends of the bottom to the blade portion 340. The first and second inclined sides 324 and 326 are respectively inclined such that a width of the dovetail 320 decreases toward the blade portion 340.

Accordingly, the dovetail portions 320 of the vanes can be fastened by being fitted in the dovetail grooves 220 of the ring in the axial direction of the tie rod 10.

However, the present invention is not limited thereto and the dovetail portions can be formed in any shape as long as they laterally protrude in the circumferential direction of the ring 200 and can be fixed, so as not to separate in the radial direction of the ring 200 after being fitted into the dovetail grooves of the ring 200.

The fixing parts are provided to firmly and tightly fix the vanes 300 on the ring 200. The fixing parts are fastened through the ring 200 from the outer side of the ring 200 to be in contact with the bottoms of the dovetail portions 320, and the first and second inclined sides 324 and 326 can be fitted into a corresponding dovetail groove 220 by being forcibly inserted into the dovetail grooves 220.

In detail, as shown in FIG. 5, the fixing parts may be a pair of fixing members 400 that are arranged to coincide with a line extending in the direction in which the dovetail portion 320 of a vane is fitted into a dovetail groove 220.

A pair of fixing members 400 is provided for the dovetail portion 320 of one vane and the fixing members 400 arranged in a line in the axial direction of the tie rod 10. Accordingly, the dovetail portion 320 of the vane can be fixed at two side positions, so vibration due to non-uniform contact can be prevented.

In an embodiment, the fixing members 400 may be set screws. Accordingly, when the fixing members 400 are secured until they come in contact with the bottom 322 of the dovetail portion from the outer side of the ring 200, the front ends of the fixing members 400 come in contact with the bottom 322, so it is possible to firmly bring the dovetail portion 320 in tight contact with the inner side of the dovetail groove 220 of the ring.

Accordingly, the vane 300 is firmly and tightly fixed in contact with the ring 200, that is, the dovetail portion 320 of the vane is firmly and tightly in contact with the dovetail groove 220 of the ring, so as not to move in the dovetail groove 220, so vibration of the vane 300 can be prevented.

Further, since set screws are used to fix the vanes, assembly and disassembly is simple and convenient, facilitating maintenance.

Further, since the first and second inclined sides 324 and 326 are firmly and tightly in contact with the dovetail portion 220, it is further possible to inhibit wear at the contact portion.

Another embodiment of the present invention, as shown in FIG. 7, may further include elastic intermediate members 500 disposed between the dovetail groove 220 and the first and second inclined sides 324 and 326 facing the dovetail groove 220.

The elastic intermediate members 500 may be any material as long as it has elasticity. The elastic intermediate members 500 have a flat shape and can be hermetically pressed between the dovetail groove 220 and the first and second inclined sides 324 and 326 facing the dovetail groove 220.

Accordingly, the dovetail portion 320 can be more firmly and tightly pressed into the dovetail groove 220.

However, the present invention is not limited thereto and a coating layer (not shown) for preventing wear may be formed on the first and second inclined sides 324 and 326.

Accordingly, it is possible to inhibit wear of the vane 300 and reduction of the fastening force to the ring 200.

The structure in which the vane ring assembly according to an embodiment of the present invention is combined with the compressor 2 is described hereafter with reference to FIGS. 2 and 4.

The vane carriers 100 are disposed in the casing 2 and three vane carriers 100 are provided in an embodiment, as shown in FIG. 2. Although FIG. 2 depicts an example casing 2 having three vane carriers 100, the casing 2 of the present embodiment is not limited thereto and may include one or more (at least one) vane carriers 100, wherein a retaining ring 200 may be provided for each vane carrier 100.

A plurality of ring grooves 120 circumferentially extending is formed on the inner sides of each of the vane carriers 100 so that the rings 200 can be fitted therein. The ring grooves 120 may be formed in parallel in the axial direction of the tie rod 10.

The retaining rings 200 may have a cross-sectional shape corresponding to the ring grooves 120 to be fitted in the ring grooves 120.

Accordingly, the retaining rings 200 each with the vanes 300 fixed thereto by the fixing parts can be respectively fitted into ring grooves 120 circumferentially formed on the inner sides of the vane carriers 100.

That is, a plurality of vanes 300 are fitted into the dovetails 220 of a ring 200 and then the dovetail portions 320 of the vanes are fixed firmly and are tightly in contact with the dovetail grooves 220 by the fixing members 400, thereby forming a vane ring assembly. Then, these vane ring assemblies are respectively fitted into the ring grooves 120 of the vane carriers 100.

To this end, the casing 2 may be composed of separate halves that can be combined and the retaining rings 200 each may also be composed of separate halves such that they are circumferentially fitted in the ring grooves 120 of the halves of the casing 2 and then combined with each other.

Although the retaining rings 200 are disposed on the inner side of the vane carrier 100 in the above description, the retaining rings 200 may be disposed directly on the inner side of the casing 2.

The present invention is not limited to the specific embodiments and the above description and may be modified in various ways without departing from the scope of the present invention described in claims by those skilled in the art, and the modifications are included in the scope of the present invention.

What is claimed is:

1. A vane ring assembly comprising:
   a retaining ring having an inner circumferential side and an outer circumferential side, the inner circumferential side including at least one dovetail groove in which is formed an outwardly recessed slot that extends in an axial direction of the retaining ring;
   at least one vane configured to be fastened to the retaining ring, each of the at least one vane comprising a dovetail portion in which is formed an inwardly recessed slot that extends in the axial direction, the inwardly recessed slot including a flat surface configured to face the outwardly recessed slot; and a plurality of set screws configured to pass through the retaining ring from the outer circumferential side of the retaining ring, the set screws being arranged to coincide with a line extending in a direction in which the dovetail portion is fitted into the dovetail groove, each of the plurality of set screws having one end extending through the outwardly recessed slot of each of the at least one dovetail groove to engage with the flat surface of the inwardly recessed slot of each of the at least one vane.

2. The vane ring assembly of claim 1, wherein the plurality of set screws are further configured to fix each of the at least one vane to the inner circumferential side of the retaining ring.

3. The vane ring assembly of claim 1,
wherein the one end of each of the plurality of set screws has a maximum diameter, and the outwardly recessed slot includes a flat surface that has a minimum width in a circumferential direction of the retaining ring, and
wherein the minimum width is greater than the maximum diameter.

4. The vane ring assembly of claim 1,
wherein the one end of each of the plurality of set screws has a maximum diameter, and the flat surface of the inwardly recessed slot has a minimum width in a circumferential direction of the retaining ring, and
wherein the minimum width is greater than the maximum diameter.

5. The vane ring assembly of claim 1, wherein the plurality of set screws include a pair of set screws for each of the at least one vane, each pair being disposed on a straight line extending in the axial direction so that the dovetail portion of the at least one vane is fixed at two positions separated from each other in the axial direction.

6. The vane ring assembly of claim 1,
wherein the outwardly recessed slot is recessed in a radial direction of the retaining ring and includes a first end and a second end disposed opposite to the first end in the axial direction,
wherein the first end of the outwardly recessed slot is connected with a first surface of the retaining ring, the first surface facing upstream in the axial direction, and
wherein the second end of the outwardly recessed slot is connected with a second surface of the retaining ring that is disposed opposite to the first surface in the axial direction and faces downstream in the axial direction.

7. The vane ring assembly of claim 1,
wherein the inwardly recessed slot is recessed in a radial direction of the at least one vane and includes a first end and a second end disposed opposite to the first end in the axial direction,
wherein the first end of the inwardly recessed slot is connected with a first surface of the at least one vane, the first surface facing upstream in the axial direction, and
wherein the second end of the inwardly recessed slot is connected with a second surface of the at least one vane that is disposed opposite to the first surface in the axial direction and faces downstream in the axial direction.

8. The vane ring assembly of claim 1, wherein the at least one vane consists of a plurality of vanes, and the at least one dovetail groove consists of a plurality of dovetail grooves that are disposed around the retaining ring and are configured to respectively receive the plurality of vanes.

9. The vane ring assembly of claim 8, wherein the dovetail portion of each of the plurality of vanes is fitted into a corresponding dovetail groove and comprises a blade portion protruding in a radial direction of the retaining ring.

10. The vane ring assembly of claim 9, wherein the plurality of set screws are arranged in a direction in which a dovetail portion of the plurality of vanes is fitted into the corresponding dovetail groove.

11. The vane ring assembly of claim 10, wherein the dovetail portion of each of the plurality of vanes comprises:
a bottom; and
first and second inclined sides respectively extending from opposite ends of the bottom to the blade portion, the first and second inclined sides respectively inclined such that a width of the dovetail decreases toward the blade portion.

12. The vane ring assembly of claim 11, wherein the plurality of set screws are further configured to respectively engage with the bottom of the dovetail portion of each of the plurality of vanes.

13. The vane ring assembly of claim 11, wherein the first and second inclined sides are fitted into the corresponding dovetail groove by being forcibly inserted into the corresponding dovetail groove.

14. The vane ring assembly of claim 13, further comprising:
a coating layer formed on the first and second inclined sides to inhibit wear of surfaces the dovetail portion of each of the plurality of vanes that are brought into contact with the corresponding dovetail groove.

15. The vane ring assembly of claim 1,
wherein the at least one dovetail groove comprises a first bottom surface in which the outwardly recessed slot is formed,
wherein the dovetail portion of the at least one vane comprises a second bottom surface in which the inwardly recessed slot is formed, the first bottom surface configured to receive the second bottom surface on either side of the recessed slots,
wherein the at least one dovetail groove further comprises a first pair of opposing sides that are inclined in a radial direction of the retaining ring and respectively extend from opposite ends of the first bottom surface in the radial direction, and
wherein the dovetail portion of each of the at least one vane further comprises a second pair of opposing sides that are inclined in the radial direction and respectively extend from opposite ends of the second bottom surface in the radial direction.

16. The vane ring assembly of claim 1,
wherein the at least one dovetail groove comprises a first pair of opposing sides that are inclined in a radial direction of the retaining ring and respectively extend in the radial direction, and
wherein the dovetail portion of each of the at least one vane comprises a second pair of opposing sides that are inclined in the radial direction and respectively extend in the radial direction, the first pair of opposing sides configured to receive the second pair of opposing sides.

17. The vane ring assembly of claim 16, further configured to comprising:
a first elastic intermediate member disposed between a first side of the first pair of opposing sides of the at least one dovetail groove and a first side of the second pair of opposing sides of the dovetail portion of each of the at least one vane; and a second elastic intermediate member disposed between a second side of the first pair of opposing sides of the at least one dovetail groove and a second side of the second pair of opposing sides of the dovetail portion of each of the at least one vane, wherein each of the first and second elastic intermediate member is made of an elastic material configured to be hermetically pressed between the at least one dovetail groove and the dovetail portion of each of the at least one vane and to inhibit wear of surfaces the dovetail portion of each of the plurality of vanes that are brought into contact with the corresponding dovetail groove.

18. The vane ring assembly of claim 17, wherein each of the first and second elastic intermediate members has a flat shape, wherein the first elastic intermediate member has a first flat side that is brought into contact with the first side of the first pair of opposing sides of the at least one dovetail groove and a second flat side that is brought into contact with the first side of the second pair of opposing sides of the dovetail portion of each of the at least one vane, and wherein the second elastic intermediate member has a first flat side that is brought into contact with the second side of the first pair of opposing sides of the at least one dovetail groove and a second flat side that is brought into contact with the second side of the second pair of opposing sides of the dovetail portion of each of the at least one vane.

19. A compressor comprising:

a casing;

at least one vane carrier disposed inside the casing;

at least one retaining ring respectively fitted in each of the at least one vane carrier, each retaining ring having an inner circumferential side and an outer circumferential side, the inner circumferential side including a plurality of dovetail grooves in each of which is formed an outwardly recessed slot that extends in an axial direction of the retaining ring;

a plurality of vanes respectively disposed around the inner circumferential side of each retaining ring and configured to be fastened to each retaining ring, each of the plurality of vanes comprising a dovetail portion in which is formed an inwardly recessed slot that extends in the axial direction, the inwardly recessed slot including a flat surface configured to face the outwardly recessed slot; and a plurality of set screws configured to pass through each of the at least one retaining ring from the outer circumferential side of a corresponding retaining ring, the set screws being arranged to coincide with a line extending in a direction in which the dovetail portion is fitted into the dovetail groove, each of the plurality of set screws having one end extending through the outwardly recessed slot of each of the plurality of dovetail grooves to engage with the flat surface of the inwardly recessed slot of each of the plurality of vanes.

20. A gas turbine comprising:

a compressor to suction and compress air to a high pressure;

a combustor to mix the compressed air with fuel and combust the mixture; and a turbine to generate power by rotating turbine blades, using combustion gas discharged from the combustor, wherein the compressor comprises:

a casing;

at least one vane carrier disposed inside the casing;

at least one retaining ring respectively fitted in each of the at least one vane carrier, each retaining ring having an inner circumferential side and an outer circumferential side, the inner circumferential side including a plurality of dovetail grooves in each of which is formed an outwardly recessed slot that extends in an axial direction of the retaining ring;

a plurality of vanes respectively disposed around the inner circumferential side of each retaining ring and configured to be fastened to each retaining ring, each of the plurality of vanes comprising a dovetail portion in which is formed an inwardly recessed slot that extends in the axial direction, the inwardly recessed slot including a flat surface configured to face the outwardly recessed slot; and a plurality of set screws configured to pass through each of the at least one retaining ring from the outer circumferential side of a corresponding retaining ring, the set screws being arranged to coincide with a line extending in a direction in which the dovetail portion is fitted into the dovetail groove, each of the plurality of set screws having one end extending through the outwardly recessed slot of each of the plurality of dovetail grooves to engage with the flat surface of the inwardly recessed slot of each of the plurality of vanes.

\* \* \* \* \*